UNITED STATES PATENT OFFICE.

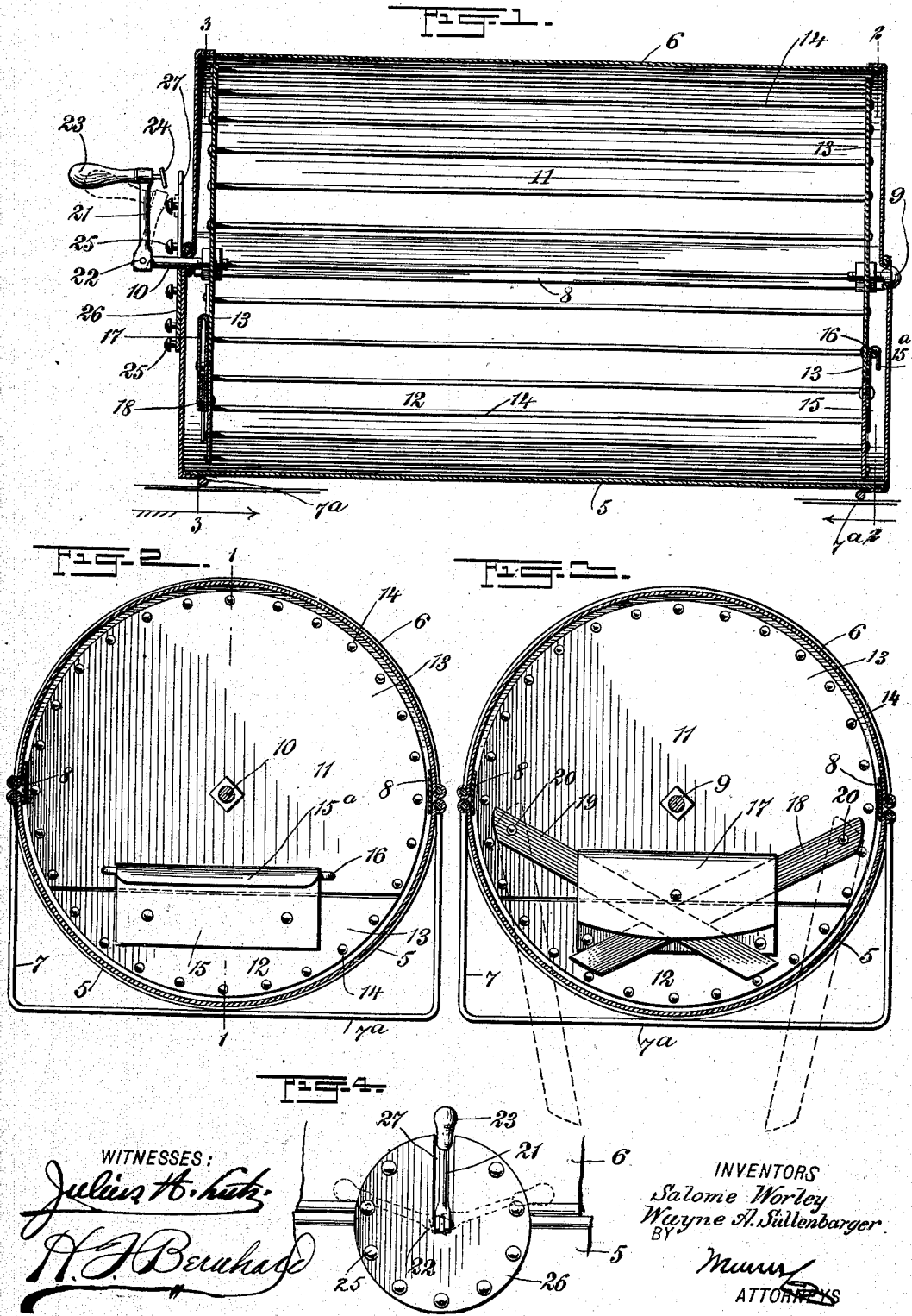

SALOMÈ WORLEY AND WAYNE ANTHONY SULLENBARGER, OF BELLE PLAINE, IOWA.

CULINARY APPLIANCE.

SPECIFICATION forming part of Letters Patent No. 714,430, dated November 25, 1902.

Application filed March 5, 1902. Serial No. 96,781. (No model.)

*To all whom it may concern:*

Be it known that we, SALOMÈ WORLEY and WAYNE ANTHONY SULLENBARGER, citizens of the United States, and residents of Belle Plaine, in the county of Benton and State of Iowa, have invented new and useful Improvements in Culinary Appliances, of which the following is a full, clear, and exact description.

Our invention relates to improvements in culinary appliances of that character known as "meat-roasters," in which various kinds of meats and poultry may be roasted and basted with ease and despatch.

The object that we have in view is the provision of a simple, efficient, and durable article which may be conveniently used in any oven, which permits the meat or the like to be easily placed in or removed from the device, which allows the roast to be conveniently turned from time to time, and which provides for holding the roast at any desired point of adjustment in order that the meat, &c., may be browned, basted, or roasted at any particular part, thereby making the roasts sweeter and more palatable.

With these ends in view the invention consists in the novel construction, arrangement, and combination of parts, which will be hereinafter described, and the actual scope of the invention will be defined by the claims.

Reference is to be had to the accompanying drawings, forming a part of this specification, in which similar characters of reference indicate corresponding parts in all the figures.

Figure 1 is a longitudinal vertical section through a roasting apparatus embodying our invention, the plane of the section being indicated by the dotted line 1 1 of Fig. 2. Fig. 2 is a vertical cross-section in the plane of the dotted line 2 2 of Fig. 1 looking in the direction of the arrow. Fig. 3 is another vertical cross-section looking in the opposite direction, as indicated by the arrow, and taken in the plane of the dotted line 3 3 of Fig. 1; and Fig. 4 is a detail view in elevation, illustrating the means for locking the skeleton drum at any point of its rotation.

The inclosing casing of our improved roasting apparatus consists of the base-section 5 and the removable cover-section 6, said sections adapted to be assembled in matching relation, as shown by Figs. 2 and 3, in order to provide the closed chamber within which is housed or contained the revoluble skeleton cylinder or drum, to be hereinafter described. The base-section 5 of the casing is provided with the stands 7, which are preferably made of wire and disposed at the end portions of the casing. The wire stands are bent to form the cross-pieces $7^a$ and the upstanding bars, which are fastened to the outside of the base-section 5, and these cross-pieces $7^a$ of the stands are disposed in the same horizontal plane, so as to firmly support the casing in a stationary position on a table or within an oven. The removable cover-section 6 of the casing is provided with the flanges 8, which are adapted to fit within the edges of the base-section 5, as shown by Figs. 2 and 3, and said cover-section is arranged to rest upon the base-section, whereby the cover-section will be fitted snugly to the base-section.

The base-section is provided at its end portions with suitable openings adapted to receive the journals or shafts 9 and 10 of the skeleton drum or cylinder. This drum or cylinder is in two sections, (indicated at 11 12,) which are separably coupled together and are adapted to be firmly locked in operative relation one to the other. The section 11 of the skeleton drum is materially larger than the section 12 thereof, and each section consists of a plate 13 and a series of rods or spindles 14. The plates 13 of the drum-sections have curved outer edges and straight inner edges, so that they may be arranged for the straight inner edges to bear one against the other, and these plates at the ends of each section 11 or 12 have the series of rods 14 secured firmly thereto in any desired way. The plates and the rods form a substantial, cheap, and simple construction of the skeleton drum, thus overcoming the use of pins, which are liable to work loose. The members or sections 11 12 of the drum may be coupled together in any desired way; but in Figs. 2 and 3 we have shown preferred means for accomplishing such connection. The sections at the left-hand end of the drum (shown by Fig. 1) are separably coupled by a plate 15 engaging with a loop 16. (See Fig. 2.) This coupling-plate is fastened to one end plate 13 of the drum-section 12, and said coupling-plate is provided with a turned-over edge, forming a hook 15ᵃ, the latter being adapted to engage with the loop 16, which is secured to the end plate of the other drum-section 11. The other ends of the members 11 12 are united by the coupling and locking device. (Shown more clearly by Fig. 3.) This device includes a keeper-plate 17, which is firmly secured to the end plate 13 of the drum member 12, said keeper-plate being adapted to extend beyond a line between the two plates of the right-hand end of the drum when the sections of the latter are assembled together. Links 18 19 are pivoted to the end plate of the drum-section 11, as indicated at 20, and these links are adapted to be folded together within the keeper-plate 17 in a manner to bring the links in a crossing relation, as shown by Fig. 3. The links are adapted to have frictional engagement with each other and with the front and back portions of the keeper-plate. It will be observed that the coupling consists of a keeper-plate which is attached to one drum member and a pair of links which are pivoted to the other drum member and are adapted to have frictional engagement with the keeper-plate, thus bringing the two members of the drum into close relation.

The skeleton cylinder or drum is adapted to turn freely within the cylindrical casing, because its trunnions or shafts 9 10 support said cylinder for axial rotation. The shaft 10 is provided with a crank 21, which is pivoted to said shaft, as at 22. This crank is equipped with an operating-handle 23, and said crank is provided with a locking projection 24, which engages with one of a series of headed studs 25, the latter being secured to a disk 26, which is fastened to the left-hand end of the base-section 5 of the casing. Said disk is provided with a radial slot 27, which allows the shaft 10 to be easily passed through the disk when the cylinder is inserted or removed.

In using our improved roasting device the cover-section 6 is lifted off the base of the casing and the skeleton drum or cylinder is removed from said casing. The member 12 of the drum is detached from the member 11 by withdrawing the links 18 19 from engagement with the keeper 17, said links being moved to the positions shown by dotted lines in Fig. 3, after which the drum-section 12 is manipulated so as to disengage the hook 15ᵃ of the plate 15 from the loop 16. The drum or cylinder is now opened fully throughout its length to enable the operator to have easy access to the large section 11 thereof, and the meat, poultry, or any other substance may easily be placed in the drum-section 11. The drum-section 12 is now readjusted to the section 11, so as to bring its hook 15ᵃ into engagement with the loop 16, and thereafter the links 18 19 are folded within the keeper 17 to the position shown by full lines in Fig. 3. The drum is thus closed and locked by the devices at its ends, and said drum is fitted in the base-section 5, so that the shafts 9 10 will enter the proper openings therein. If desired, a suitable quantity of water or other liquid may be placed in the lower portion of the casing, and then the cover-section 6 is fitted to the base 5, so as to snugly close the casing. The entire device may now be transferred to a suitable oven, and the contents may be roasted and basted. It will be observed that the meat is suspended within the skeleton drum to allow the moisture to thoroughly permeate the meat and the heat to circulate around the same. The drum may be turned from time to time by manipulating the crank 21, and said drum may be locked at any point of its rotation by forcing the locking projection 24 into engagement with one of the studs 25.

Our improved device forms a self-basting roaster which is wholly free from pins and other parts that are liable to work loose. The drum may be operated so as to secure uniform basting, browning, and roasting of the meat therein. The apparatus requires a very small quantity of water or other liquid, and it enables the meat to be roasted or cooked in a very short time, thus effecting a saving in fuel. The cylinder can be easily removed and taken apart to insert or remove the meat roasts, chickens, turkeys, &c. The device is neat in appearance and compact in construction, thus requiring a minimum amount of room in the oven.

It is evident that the lower member of the pan may be equipped with suitable handles and that appropriate lifting devices may be used on the upper member of the pan; but as these are obvious expedients we do not consider it necessary to more fully describe or to illustrate the same.

Having thus described our invention, we claim as new and desire to secure by Letters Patent—

1. In an article of the class described, a revoluble drum having separable sections, a keeper on one of said sections, and links connected to the other section and foldable within said keeper to detachably connect the two sections.

2. A culinary roaster comprising a suitable casing, a two-part drum or cylinder having its members separably fitted together, coöperating coupling devices provided on the members of the cylinder at one end thereof, a keeper attached to one section of the cylinder at its opposite end, and links pivoted to the other section of the cylinder and adjusted into engagement with the keeper.

3. An article of the class described, comprising a suitable casing, a drum divided into sections of unequal area and the larger section provided with trunnions which are mounted in the casing, coupling devices at one end of the drum, latch devices at the other end of the drum and separably fastening the sections of the drum in registration with each other, a drum-locking plate attached to the outside of the casing, and a crank pivoted to one of the drum-trunnions and adjustable at any point of its rotation into interlocking engagement with said plate.

In testimony whereof we have signed our names to this specification in the presence of two subscribing witnesses.

SALOME WORLEY.
WAYNE ANTHONY SULLENBARGER.

Witnesses:
A. L. RUSK,
W. A. MALL.